(12) United States Patent
Sohn et al.

(10) Patent No.: US 11,566,314 B2
(45) Date of Patent: Jan. 31, 2023

(54) ZINC ALLOY PLATED STEEL MATERIAL HAVING EXCELLENT CORROSION RESISTANCE AFTER BEING PROCESSED

(71) Applicant: POSCO, Pohang-si (KR)

(72) Inventors: Il-Ryoung Sohn, Gwangyang-si (KR); Tae-Chul Kim, Gwangyang-si (KR); Jong-Sang Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 16/771,097

(22) PCT Filed: Dec. 13, 2018

(86) PCT No.: PCT/KR2018/015826
§ 371 (c)(1),
(2) Date: Jun. 9, 2020

(87) PCT Pub. No.: WO2019/132336
PCT Pub. Date: Jul. 4, 2019

(65) Prior Publication Data
US 2021/0002751 A1     Jan. 7, 2021

(30) Foreign Application Priority Data
Dec. 26, 2017 (KR) .................. 10-2017-0180328

(51) Int. Cl.
*C22C 18/04* (2006.01)
*C22C 18/00* (2006.01)
(Continued)

(52) U.S. Cl.
CPC ............... *C23C 2/06* (2013.01); *B32B 15/01* (2013.01); *B32B 15/013* (2013.01); *B32B 15/04* (2013.01);
(Continued)

(58) Field of Classification Search
CPC ....... C23C 28/021; C23C 28/025; C23C 2/06; C23C 2/26; C23C 2/02; C23C 2/14;
(Continued)

(56) References Cited

U.S. PATENT DOCUMENTS

2003/0072963 A1    4/2003   Komatsu et al.
2010/0304183 A1   12/2010   Honda et al.
(Continued)

FOREIGN PATENT DOCUMENTS

CN   105483547 A    4/2016
EP   1557478        7/2005
(Continued)

OTHER PUBLICATIONS

Machine Translation, Honda, et al., JP 2011-144429, Jul. 2011. (Year: 2011).*
(Continued)

*Primary Examiner* — Michael E. La Villa
(74) *Attorney, Agent, or Firm* — Cantor Colburn LLP

(57) ABSTRACT

Provided is a plated steel material which can be used for an automobile, a household appliance, a building material, and the like and, more particularly, to a zinc alloy plated steel material having excellent corrosion resistance after being processed and a method for manufacturing the same.

6 Claims, 3 Drawing Sheets

(51) Int. Cl.

| | |
|---|---|
| *C22C 38/04* | (2006.01) |
| *C22C 38/02* | (2006.01) |
| *C22C 38/00* | (2006.01) |
| *B32B 15/01* | (2006.01) |
| *C23C 2/06* | (2006.01) |
| *C23C 2/02* | (2006.01) |
| *C23C 2/14* | (2006.01) |
| *C23C 2/28* | (2006.01) |
| *C21D 8/02* | (2006.01) |
| *C21D 9/46* | (2006.01) |
| *C21D 1/76* | (2006.01) |
| *C23C 2/26* | (2006.01) |
| *C23C 30/00* | (2006.01) |
| *C23C 28/02* | (2006.01) |
| *B32B 15/04* | (2006.01) |
| *C23C 2/40* | (2006.01) |
| *B32B 15/18* | (2006.01) |

(52) U.S. Cl.
CPC ............ *B32B 15/043* (2013.01); *B32B 15/18* (2013.01); *C21D 1/76* (2013.01); *C21D 8/0226* (2013.01); *C21D 8/0236* (2013.01); *C21D 8/0263* (2013.01); *C21D 8/0273* (2013.01); *C21D 9/46* (2013.01); *C22C 18/00* (2013.01); *C22C 18/04* (2013.01); *C22C 38/00* (2013.01); *C22C 38/002* (2013.01); *C22C 38/02* (2013.01); *C22C 38/04* (2013.01); *C23C 2/02* (2013.01); *C23C 2/14* (2013.01); *C23C 2/26* (2013.01); *C23C 2/28* (2013.01); *C23C 2/40* (2013.01); *C23C 28/021* (2013.01); *C23C 28/025* (2013.01); *C23C 30/00* (2013.01); *C23C 30/005* (2013.01); *Y10T 428/12674* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01)

(58) Field of Classification Search
CPC .. C23C 2/28; C23C 2/40; C23C 30/00; C23C 30/005; C21D 9/46; C21D 8/0226; C21D 8/0263; C21D 8/0236; C21D 8/0273; C21D 1/76; B32B 15/013; B32B 15/01; B32B 15/04; B32B 15/043; B32B 15/18; C22C 18/04; C22C 18/00; C22C 38/002; C22C 38/02; C22C 38/04; C22C 38/00; Y10T 428/12674; Y10T 428/12799; Y10T 428/12951; Y10T 428/12938; Y10T 428/12972; Y10T 428/12979; Y10T 428/12958

See application file for complete search history.

(56) References Cited

U.S. PATENT DOCUMENTS

| | | |
|---|---|---|
| 2014/0127531 A1 | 5/2014 | Yasui et al. |
| 2016/0281201 A1 | 9/2016 | Shimizu et al. |

FOREIGN PATENT DOCUMENTS

| | | |
|---|---|---|
| JP | H06306461 | 11/1994 |
| JP | 2000265255 | 9/2000 |
| JP | 2001295018 | 10/2001 |
| JP | 2001355055 | 12/2001 |
| JP | 2002332555 | 11/2002 |
| JP | 2006052462 | 2/2006 |
| JP | 2011144429 | 7/2011 |
| JP | 5482914 | 5/2014 |
| KR | 20080080416 | 9/2008 |
| KR | 20100124436 | 11/2010 |
| KR | 20140007964 | 1/2014 |
| KR | 20150070841 | 6/2015 |
| KR | 20160064239 | 6/2016 |
| KR | 20160078918 | 7/2016 |
| KR | 101726090 | 4/2017 |

OTHER PUBLICATIONS

Machine Translation, Lee et al., KR 1020150070841 A1, Jun. 2015. (Year: 2015).*
International Search Report—PCT/KR2018/015826 dated Mar. 14, 2019.
European Search Report—European Application No. 18893849.2 dated Feb. 4, 2021, citing JP 2006-052462, EP 1557478, and US 2003/0072963.
Indian Office Action—Indian Application No. 202017025985 dated Jul. 12, 2021, citing EP 1557478 and JP 2001-355055.
Japanese Office Action—Japanese Application No. 2020-534879 dated Jun. 29, 2021, citing KR 10-2015-0070841, JP 2011-144429, and JP H06-306461.
Kazumi Nishimura, et al. "Influence of Surface Condition of Hot-Rolled Steel Sheet on the Reaction of Hot-dip alvanizing", Wisco Technology, No. 12, Dec. 31, 1993, pp. 1-8.

* cited by examiner

ZINC ALLOY PLATED STEEL MATERIAL HAVING EXCELLENT CORROSION RESISTANCE AFTER BEING PROCESSED

TECHNICAL FIELD

The present invention relates to a plated steel material which can be used in an automobile, a household appliance, a building material, and the like, and more particularly, to a zinc alloy plated steel material having excellent corrosion resistance after being processed and a method for manufacturing the same.

BACKGROUND ART

A zinc plating method for inhibiting corrosion of iron by cathodic protection has been widely used in manufacturing a steel material having high corrosion resistance, due to having excellent protection performance and economical efficiency. In particular, a hot-dip galvanized steel material forming a plated layer by immersing a steel material into molten zinc is involved with a relatively simple manufacturing process and relatively low product costs, compared to an electrogalvanized steel material, and thus, a demand for the hot-dip galvanized steel material in an automobile, a household appliance, a building material, and the like, is increasing.

The hot-dip galvanized steel material may have characteristics of sacrificial corrosion protection, in which zinc having relatively low oxidation-reduction potential is corroded before iron is corroded such that corrosion of the steel material is inhibited when exposed to a corrosive environment. In addition, corrosion resistance of the steel material may be improved by forming a dense corrosion product on a surface of the steel material to block the steel material from an oxidizing environment as the zinc of a plated layer is oxidized.

However, due to air pollution and deterioration of a corrosive environment increased due to advancement of the industry and strict regulations on resource and energy saving, there is an increasing need for developing a steel material having better corrosion resistance, compared to the conventional galvanized steel. As a part of the above, various studies have been conducted into a technology of manufacturing a zinc alloy-based plated steel material to improve the corrosion resistance of the steel material by adding elements such as aluminum (Al) and magnesium (Mg) to a zinc plating bath. As a representative zinc alloy-based plated steel material, studies have been actively conducted into a technology of manufacturing a Zn—Al—Mg-based plated steel material in which Mg is additionally added to a Zn—Al plating composition system (Patent Document 1).

Meanwhile, when cracking occurs in a plated layer when a galvanized steel material is processing-molded, the plated layer deteriorates the corrosion inhibiting effect and facilitates the sacrificial protection of the plated layer of the area in which the cracking has occurred, thereby reducing corrosion resistance. Accordingly, there is increasing demand for resolutions for reducing the deterioration of the corrosion resistance after processing.

(Patent Document 1) Japanese Patent Publication No. 2002-332555

DISCLOSURE

Technical Problem

An aspect of the present invention is to provide a zinc alloy plated steel material having excellent corrosion resistance as well as preventing corrosion deterioration by reducing cracking of a plated layer when processing, and a method of manufacturing the same.

The problems to be solved by the present invention are not limited to the problems mentioned above, and other problems not mentioned will be clearly understood by those skilled in the art from the following description.

Technical Solution

According to an aspect of the present invention, a zinc alloy plated steel material having excellent corrosion resistance after being processed, comprising a base steel; a zinc alloy plated layer formed on the base steel; and an inhibition layer formed between the base steel and the zinc alloy plated layer, wherein the zinc alloy plated layer comprises, by wt %, 0.5% to 3.5% of magnesium (Mg), 0.5% to 11.0% of aluminum (Al), 10 ppm to 350 ppm of silicon (Si), a remainder of zinc (Zn) and inevitable impurities, and the inhibition layer comprises a Si-concentrated layer.

According to another aspect of the present invention, a method of manufacturing a zinc alloy plated steel material having excellent corrosion resistance after being processed comprises preparing a hot-rolled steel material having a grain size of 1 μm to 100 μm; cold-rolling the hot-rolled steel material to manufacture a cold-rolled steel material having a surface roughness of 0.2 μm to 1.0 μm and a steepness of 0.2 to 1.2; immersing a base steel, the cold-rolled steel material, into a plating bath comprising, by wt %, 0.5% to 3.5% of magnesium (Mg), 0.5% to 11.0% of aluminum (Al), 10 ppm to 350 ppm of silicon (Si), a remainder of zinc (Zn) and inevitable impurities, to plate; and wiping and cooling the hot-dip zinc alloy plated steel material.

Advantageous Effects

According to the present invention, a Zn—Al—Mg-based plated steel material having excellent corrosion resistance after being processed, and a method for manufacturing the same may be provided. In this regard, there is an advantage in that a use area may be increased to an area to which a conventional use is limited.

BEST MODE

Figure 1:
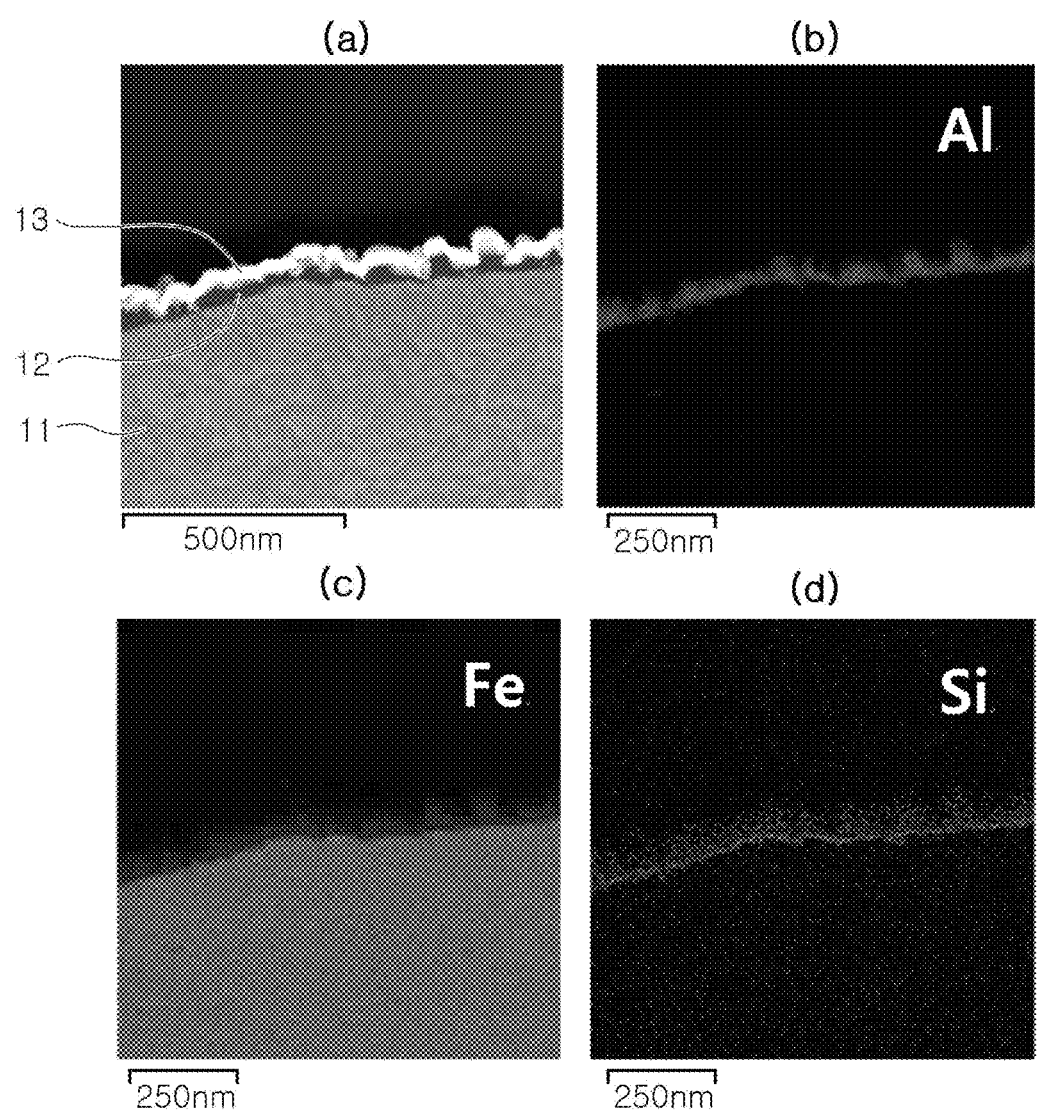
FIG. 1 is a photographic image illustrating an analysis of components of an inhibition layer of a zinc alloy plated steel material manufactured as an exemplary embodiment of the present invention.

While a conventional zinc plating process involves solidification as a single Zn phase, a Zn—Al—Mg-based zinc alloy plating process involves coexistence of a Zn phase, an Mg—Zn alloy phase, an Al phase, and the like. Such a plated structure may form a very complex plated structure depending on physical and chemical conditions of a surface of the base steel in accordance with trace elements, manufacturing processes, or the like, in the plating bath.

A Zn—Mg alloy phase in a plated structure of a Zn—Al—Mg-based zinc alloy plated layer (hereinafter, a zinc alloy plated layer or a plated layer) may be formed of various intermetallic compounds, such as $MgZn_2$, $Mg_2Zn_{11}$, and the like, and hardness thereof is Hv 250 to 300. In addition, an inhibition layer formed of intermetallic compounds of Fe and Al may be formed at an interface between the plated layer and the base steel. The intermetallic compounds of Fe and Al may be $Fe_4Al_{13}$, $Fe_2Al_5$, and the like. As the intermetallic compounds also have relatively high brittleness, cracking is likely to occur in the plated layer during physical deformation.

In this regard, the present inventors endeavored to develop a method for forming the inhibition layer to be firm and uniform as a measure for securing excellent corrosion resistance after processing by reducing cracking occurrence of the plated layer during the processing of the zinc alloy plated steel material, thereby completing the present invention. Hereinbelow, the present invention will be described in detail.

The zinc alloy plated steel material of the present invention includes a base steel, a zinc alloy plated layer formed on the base steel, and an inhibition layer formed between the base steel and the zinc alloy plated layer.

It is preferable that the zinc alloy plated layer comprises, by wt %, 0.5% to 3.5% of magnesium (Mg), 0.5% to 11.0% of aluminum (Al), 10 ppm to 350 ppm of silicon (Si), a remainder of zinc (Zn) and inevitable impurities. Each component will be described below in detail.

Magnesium (Mg) can play a very important role in improving corrosion resistance of a zinc-based plated steel material and can form a zinc hydroxide-based dense corrosion product on a surface of the plated layer under a corrosive environment to effectively prevent corrosion of the zinc-based plated steel. To this end, a content of Mg is preferably 0.5 wt % or more, more preferably 0.8 wt % or more. When the content is excessively high, however, there may be a problem in that a rapidly increased amount of dross of Mg oxides is formed on a surface of the plating bath, thereby canceling an oxidation prevention effect due to an addition of a trace element. In order to prevent the problem, Mg is preferably contained in an amount of 3.5 wt % or less, more preferably in an amount of 2.0 wt % or less.

Aluminum (Al) inhibits the formation of the Mg oxide dross in the plating bath and reacts with Zn and Mg in the plating bath to form a Zn—Al—Mg-based intermetallic compound, thereby improving corrosion resistance of the plated steel material. In order to obtain the effect, a content of Al is preferably 0.5 wt % or more, more preferably 0.8 wt % or more. When the content is excessively high, however, weldability and phosphate treatment of the plated steel material may be deteriorated. In order to prevent the problem, Al is contained preferably in an amount of 11.0 wt % or less, more preferably in an amount of 6.0 wt % or less.

When forming the inhibition layer of the zinc alloy plating layer, Si is solid-solubilized in an Fe—Al compound to provide ductility. When Si is concentrated in the inhibition layer, instead of being precipitated as $Mg_2Si$, it is advantageous in improving plating adhesion and fracture toughness. For such an effect, it is preferable that Si be contained in an amount of 10 wt ppm or more. When the content is excessively high, however, an $Mg_2Si$ precipitate having brittleness at the interface between the plating layer and the base steel is formed to be coarse when a roughness or a shape of the steel sheet is not uniform, thereby inducing cracking in response to an external stress. Accordingly, it is preferable that Si do not exceed 350 ppm by weight.

The remainder includes Zn and inevitable impurities.

Meanwhile, a portion of Fe of the plating bath may be contained in the plated layer; however, most thereof is present on the inhibition layer at the interface between the plated layer and the base steel.

The zinc alloy plated layer contains a Zn phase, an Al phase, an alloy phase of Mg and Zn including an $MgZn_2$ phase and an $Mg_2Zn_{11}$ phase, and the like. The Zn phase is first solidified, while a minimal amount of Al is solid-solubilized inside. After initial crystallization of Zn, Zn and $MgZn_2$ are solidified in a lamellar form, and eventually, a ternary phase of Zn, $MgZn_2$ and Al is solidified. When a cooling speed is comparatively low, $Mg_2Zn_{11}$ may be formed in addition to $MgZn_2$. As compared to the Zn phase, $Mg_2Zn_{11}$ or $MgZn_2$ has high hardness, and may improve corrosion resistance due to Mg although it may cause cracking when an external stress is applied.

Figure 3:
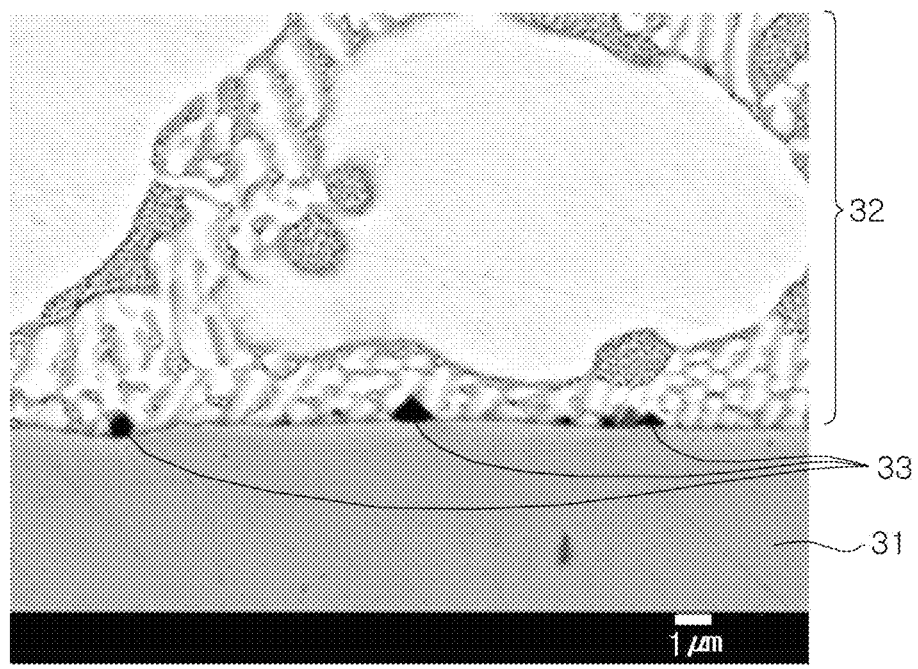
FIG. 3 is a photographic image of a cross-section of a plated layer of Comparative Example 3, among the Examples of the present invention.

The inhibition layer includes a Si-concentrated layer, in which Si is concentrated. In particular, it is preferable that the Si-concentrated layer be positioned in a lower portion of the inhibition layer. The Si-concentrated layer refers to a layer in which Si is employed in an inhibition layer formed of a Fe—Al-based compound and is included in the lower portion of the inhibition layer. The inhibition layer, by including the Si-concentrated layer in which Si is solid-solubilized, reduces mechanical breakage from the inhibition layer even though mechanical toughness, such as an external stress, is applied to the inhibition layer, thereby preventing cracking from spreading into the plated layer. It is necessary to control the components of the plating bath, metallographically control a surface of the base steel and control a surface structure and a sheet shape such that Si is uniformly distributed in the inhibition layer. When such controls are insufficient, Si is formed between the base steel and the zinc alloy plating layer as a coarse $Mg_2Si$ alloy phase. At the time of an external stress, stress is concentrated on the $Mg_2Si$ alloy phase, thereby facilitating cracking occurrence and growth. Accordingly, it is preferable that a number of the $Mg_2Si$ alloy phases between the base steel and the zinc alloy plated layer, having a diameter greater than 1000 nm per 100 μm, be 5 or less. More preferably, 5 or less of $Mg_2Si$ alloy phases having a diameter exceeding 500 nm are formed. As illustrated in FIG. 3, the $Mg_2Si$ alloy phases may be observed directly on the inhibition layer.

When the inhibition layer is uniformly formed, Si may be uniformly solid-solubilized in accordance with the inhibition layer. In the case in which a shape of the steel surface is not uniform and non-smooth decomposition of oxides present on the steel surface due to the non-uniform surface, a thickness of the inhibition layer becomes non-uniform or may not be partially formed. In this case, coarse $Mg_2Si$ may be formed. Accordingly, it is preferable that the inhibition layer be uniformly formed between the base steel and the zinc alloy plated layer.

FIG. 1 is a photographic image illustrating an analysis of components of an inhibition layer of a zinc alloy plated steel material manufactured as an exemplary embodiment of the present invention. As a method of analyzing the components of the inhibition layer, a wet analyzing method involving dissolving a plated layer in a hydrochloric acid solution, an analyzing method using a plasma generating source, such as GDOES, GDMS, or the like, an analyzing method involving directly analyzing the components using a TEM, or the like, may be used. FIG. 1 is a result of analyzing the components with a dual TEM. As illustrated in FIG. 1, on the inhibition layer of the zinc alloy plated steel material, Si-concentrated layer is formed in the lower portion of the inhibition layer.

FIG. 1A is a result of observing the inhibition layer and illustrates that the inhibition layer 12 is formed on the base steel 11. Meanwhile, the reference number "13" represents a protective film for TEM observation. FIGS. 1B to 1D illustrate analysis of the Al, Fe and Si components in the inhibition layer. In particular, FIG. 1D shows that Si is concentrated in the inhibiting layer.

Hereinbelow, an exemplary embodiment of a method for manufacturing the zinc alloy plated steel material of the present invention will be described in detail. The method for manufacturing the zinc alloy plated steel material includes preparing a base steel, immersing the prepared base steel in a plating bath to plate followed by wiping the same to adjust a thickness of the plated layer and cooling.

In terms of preparing the base steel, it is preferable that a metal structure of a hot-rolled steel material be uniform. It is preferable that a grain of the hot-rolled steel material be a surface layer portion (⅛ or less of an overall thickness from the surface). In the case of non-uniform structure of the hot-rolled steel material, particularly a surface structure, the inhibition layer is not uniformly formed and Si is not uniformly concentrated due to a non-uniform shape of the surface and non-uniform diffusion of Fe from the base steel required for forming the inhibition layer, and coarse $Mg_2Si$ is likely to be locally formed at the time of cold-rolling. To this end, an average grain size of the hot-rolled steel material is preferably 1 μm to 100 μm, more preferably 1 μm to 50 μm, most preferably 5 μm to 30 μm.

A grain size of the hot-rolled steel material less than 1 μm is advantageous in securing strength but may result in increased roughness of the surface due to the grain during cold rolling. A grain size exceeding 100 μm may be advantageous in shape homogenization; however, scale defects may be problematic and product manufacturing costs may increase. Examples of methods for securing a grain size of the hot-rolled steel material include performing hot rolling at a temperature of at least 800° C. or performing coiling at a temperature of 550° C. or above after hot rolling.

In manufacturing of a cold-rolled steel material by cold rolling the hot-rolled steel material, it is preferable that a surface roughness (Ra) and a steepness of the cold-rolled steel material be 0.2 μm to 1.0 μm and 0.2 to 1.2, respectively.

The surface roughness is determined by a rolling pressure and a surface shape of a roller when a material is rolled. When the surface roughness exceeds 1.0 μm, increased roughness may serve to form a non-uniform inhibition layer when the plated layer is formed and makes it difficult to form a uniform Si-concentrated layer. In contrast, when the surface roughness is below 0.2 μm, a surface friction coefficient is reduced and the steel material may slip on the roller.

Measurement of the steepness involves placing a steel material having a width of 1 m or more and a length of 2 m or more on a flat surface plate so that a surface thereof is closely adhered and measuring a degree of bending of the steel material. The steepness is calculated by dividing a height (H) of the bending by a wavelength (P) followed by multiplying 100. That is, the steepness may be expressed by the formula of height (H)/wavelength (P)×100. The lower the steepness, the higher the flatness of the steel material. When the steepness exceeds 1.2, the degree of bending of the steel material is significantly large and causes a deviation in surface flow when the steel material passes through the plating bath, thereby adversely affecting on the formation of the inhibition layer and the homogenization of the palted layer. A relatively lower steepness is more advantageous; however, this is not preferable as it costs excessively in order to manage the steepness to below 0.2.

A method for controlling the surface roughness and steepness in an appropriate range is not limited thereto. It is preferable that a reduction ratio be 2% to 5% during last rolling of the cold-rolling. During the rolling, it is necessary to add appropriate tension to the steel material. In addition, as an example of adding a surface roughness, plasma treatment may be performed on a surface of the steel. That is, as a final shape of the steel material is determined by the final rolling during the cold-rolling, it is preferable that the reduction ratio be 5% or less. In the case of a thin plate having a thickness of 0.5 mm, it is preferable that the reduction ratio be 2% or more to reduce overload of shear rolling.

Meanwhile, the cold-rolled steel material described above may be annealed at a temperature of 600° C. to 850° C., as necessary. At the time of annealing, it is preferable to use a gas containing 1 vol % to 10 vol % of hydrogen ($H_2$) in nitrogen ($N_2$). When a concentration of the hydrogen is less than 1 vol %, it is be difficult to reduce an oxide on a surface of the steel, whereas when a concentration of the hydrogen exceeds 10 vol %, manufacturing costs may increase. In this regard, it is preferable that 1 vol % to 10 vol % of the hydrogen be contained.

As a dew point in an atmosphere varies during annealing, not only proportions of components constituting an oxide film formed on the surface of the base steel but also an internal oxidation rate varies. Accordingly, it is preferable that the dew point be managed to be in the range of −60° C. to −10° C. When the dew point is below −60° C., excessive costs in managing purity of a raw gas may incur, thus making it undesirable. In contrast, when the dew point exceeds −10° C., contaminants on the surface of the base steel may not be easily reduced, and an oxide film, such as B, Mn, or the like, which are trace elements or impurities contained in the steel, may be formed to deteriorate plating wettability.

Thus-prepared base steel is immersed in the plating bath to manufacture a zinc alloy plated steel material. The plating bath contains, by wt %, 0.5% to 3.5% of Mg, 0.5% to 11.0% of Al, 10 ppm to 350 ppm of Si, a remainder of zinc (Zn) and inevitable impurities. Each component is the same as the above described with reference to the zinc alloy plated layer.

Meanwhile, the plated layer may additionally contain 10 ppm by weight to 80 ppm by weight of iron (Fe). The iron is mainly dissolved from the base steel to be included in the plating bath. Excessive Fe binds to Al to produce a FeAl-based compound. Si in the plating bath is also partially absorbed in the FeAl produced during the plating bath. Such a FeAl-based compound produced during the plating bath is present in the form of a solid phase, called dross, and may induce a defect by mixing into the plating layer when the plating layer is manufactured. Further, the dross absorbs Si during the plating bath to reduce a concentration of Si available for the plating bath. In this case, Si is not able to be uniformly concentrated in the inhibition layer. Accordingly, it is preferable that an overall Fe content in the plating bath do not exceed 80 wt ppm. As an example of a method for managing the Fe content to be 80 ppm or less, an inactive gas is introduced in the lower portion of the plating bath to float a compound of Fe and Al in the plating bath and reduce the Fe concentration in the plating bath. A low Fe content is not problematic; however, an excessive process cost is required to manage the Fe content to be significantly low. In this regard, 10 ppm or more of Fe can be contained.

Meanwhile, amounts of Al, Mg and Zn in the plating bath are determined based on a composition of the plated bath. It is preferable that a temperature of the plating bath at the time of plating be 10° C. to 90° C. When the plating bath temperature is not at least 10° C. higher than a melting point of the plating bath, liquidity of the plating bath is deteriorated and a uniform plating amount is interrupted. Meanwhile, the plating bath temperature at least 90° C. higher than the plating bath melting point may cause problems of an increased amount of oxides on a surface of the plating bath due to Mg oxidation in the plating bath and erosion of a plating bath refractory due to Al and Mg.

A temperature of the base steel immersed in the plating bath equal to or above the plating bath temperature is advantageous in terms of Al concentration and the surface oxides. To maximize such effects, a temperature of the steel base introduced in the plating bath is preferably at least 5° C. higher than the plating bath temperature, more preferably at least 10° C. higher. However, when the temperature of the base steel introduced in the plating bath is extremely high, it may be difficult to control a temperature of a plating port and an excessive amount of a base steel component may be dissolved to the plating bath. In this regard, the base steel temperature is preferably 30° C. or less higher, more preferably 20° C. or less higher than the plating bath temperature.

The zinc alloy plated steel material plated in the plating bath is gas-wiped to adjust a plating adhesion amount and cooled.

steel plate contains, by wt %, C: 0.03%, Si: 0.02%, Mn: 0.15%, P: 0.01%, S: 0.01%, a remainder of Fe and inevitable impurities Thus-prepared base steel plate is immersed in a zinc alloy plating bath and while adjusting a single surface adhesion amount to 50 $g/m^2$, followed by cooling to prepare a Zn—Al—Mg-based zinc alloy plated steel plate. The Al, Mg and Si of the prepared zinc alloy plated steel plate are measured and indicated in Table 1, and an Fe content in the plating bath is also measured and indicated in Table 1. The Fe content is measured at a half point between a top and a bottom of the plating bath.

A cross section of the plated layer of the zinc alloy plated steel plate is investigated, and sizes and numbers of $Mg_2Si$ alloy phases and formation of Si-concentrated layers in the inhibition layer formed between the zinc alloy plated steel plate and the base steel are measured and indicated in Table 1. The sizes and the numbers of $Mg_2Si$ alloy phases and formation of Si-concentrated layers were measured after observing a cross-section of the plated layer through a SEM.

Meanwhile, to evaluate post-processing corrosion resistance of the zinc alloy plated steel plate, the zinc alloy plated steel plate was cut into a circle having a diameter of 100 mm and processed into a cup shape using a punch having a diameter of 50 mm. Edge curvature of the punch is 5 mm, and a drawing ratio is 2.0.

The cup-shaped processed sample was subject to a strict cyclic corrosion test specified in ISO TC 156. The cup-shaped sample was put into a corrosion tester while having a bottom thereof face upward, and tested to observe whether a red rust occurs in the sample at every corrosion cycle. A result is shown in Table 1.

TABLE 1

| Classification | Average grain size of hot-rolled plate (μm) | Ave roughness of cold-rolled plate (Ra) | Steepness of cold-rolled plate | Plating Bath Fe (wt ppm) | Plating bath components Mg (wt %) | Al (wt %) | Si (wt ppm) | No. of $Mg_2Si$ having a diameter greater than 1000 nm per 100 μm | Si-conc layer formation in inhibition layer | Time period of red rust occurred in processed portion (CCT cycle) |
|---|---|---|---|---|---|---|---|---|---|---|
| IE 1 | 36 | 0.7 | 0.4 | 80 | 1.2 | 1.0 | 15 | 0 | ○ | 32 |
| IE 2 | 43 | 0.8 | 0.4 | 60 | 1.4 | 1.6 | 130 | 0 | ○ | 37 |
| IE 3 | 15 | 0.6 | 0.6 | 50 | 1.5 | 1.5 | 80 | 0 | ○ | 40 |
| IE 4 | 56 | 0.9 | 0.8 | 50 | 3.0 | 2.5 | 30 | 0 | ○ | 43 |
| IE 5 | 56 | 1.0 | 0.5 | 60 | 3.0 | 3.0 | 25 | 0 | ○ | 47 |
| IE 6 | 80 | 0.8 | 1.0 | 40 | 3.0 | 11.0 | 350 | 1 | ○ | 50 |
| CE 1 | 40 | 0.6 | 1.0 | 100 | 1.5 | 1.6 | UD | 0 | x | 19 |
| CE 2 | 70 | 0.8 | 1.3 | 120 | 1.3 | 1.6 | 60 | 5 | x | 21 |
| CE 3 | 21 | 0.7 | 0.5 | 40 | 1.5 | 1.4 | 600 | 7 | ○ | 22 |
| CE 4 | 50 | 1.4 | 1.2 | 30 | 1.6 | 1.7 | 5 | 0 | x | 24 |
| CE 5 | 49 | 0.8 | 0.5 | 110 | 1.6 | 1.6 | 9 | 0 | x | 25 |
| CE 6 | 12 | 1.3 | 1.5 | 140 | 1.4 | 1.6 | 50 | 4 | x | 25 |

*IE: Inventive Example,
**CE: Comparative Example,
***UD: undetected

[Mode for Invention]

Hereinafter, the Examples of the present invention will be described in detail. The following examples are only for understanding the present invention and are not intended to limit the scope of the present invention.

(Example)

Figure 2:
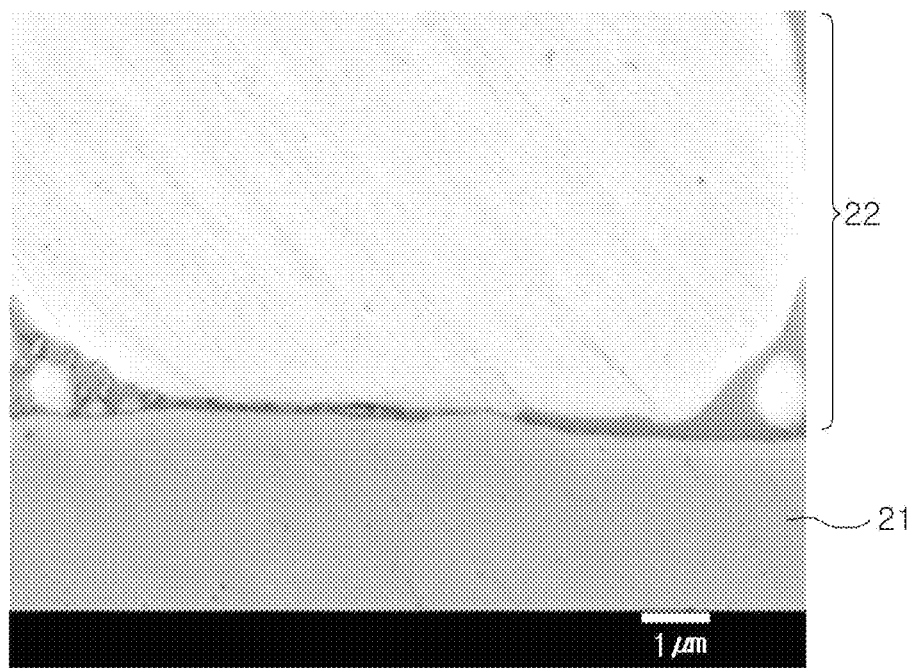
FIG. 2 is a photographic image of a cross-section of a plated layer of Inventive Example 3, among the Examples of the present invention.

A hot rolled sheet is prepared to have an average grain size indicated in Table 1 and cold-rolled to prepare abase steel plate of Table 1 below. Tension, a reduction ratio, and the like, of the steel plate were controlled during the cold rolling to prepare a base steel plate having the roughness (Ra) and the steepness indicated in Table 1 below. The base Meanwhile, FIG. 2 is a photographic image of a cross-section of a plated layer of Inventive Example 3, and FIG. 3 is a photographic image of a cross-section of a plated layer of Comparative Example 3. In FIG. 2, a uniform inhibition layer is formed between the plated layer 22 and the base steel 21, whereas in FIG. 3, a considerable amount of $Mg_2Si$ 33 is formed in the inhibition layer between the plated layer 32 and the base steel 31.

As shown in the results of Table 1 and FIGS. 2 and 3, Inventive Examples satisfying the conditions defined in the present invention has excellent corrosion resistance even after being processed. In contrast, Comparative Examples failing to meet the conditions of the present invention are shown to have deteriorated corrosion resistance for a processed portion.

The invention claimed is:

1. A zinc alloy plated steel material having excellent corrosion resistance after being processed, comprising:
   a base steel;
   a zinc alloy plated layer formed on the base steel; and
   an inhibition layer formed between the base steel and the zinc alloy plated layer,
   wherein the zinc alloy plated layer comprises, by wt %, 0.5% to 3.5% of magnesium (Mg), 0.5% to 11.0% of aluminum (Al), 10 wt ppm to 350 wt ppm of silicon (Si), a remainder of zinc (Zn) and inevitable impurities,
   the inhibition layer comprises a Si-concentrated layer, and
   a number of $Mg_2Si$ phases between the base steel and the zinc alloy plated layer, having a diameter greater than 1000 nm, is 5 or less per 100 μm.

2. The steel material of claim 1, wherein a number of $Mg_2Si$ phases between the base steel and the zinc alloy plated layer, having a diameter greater than 500 nm, is 5 or less per 100 μm.

3. The steel material of claim 1, wherein Si is solid-solubilized in the Si-concentrated layer.

4. The steel material of claim 1, wherein the Si-concentrated layer is formed in a lower portion of the inhibition layer.

5. The steel material of claim 1, wherein the inhibition layer includes intermetallic compounds of Fe and Al.

6. The steel material of claim 5, wherein the inhibition layer further includes Si solid-solubilized in the intermetallic compounds.

* * * * *